fg11_p68_lenslet_arrays?SSO=1.

United States Patent
Brock et al.

(10) Patent No.: US 10,055,624 B2
(45) Date of Patent: Aug. 21, 2018

(54) MODULE AND SYSTEM FOR, AND METHOD OF, DIRECTING AN AIMING PATTERN ON, AND ILLUMINATING, A TARGET TO BE ELECTRO-OPTICALLY READ BY IMAGE CAPTURE

(71) Applicant: SYMBOL TECHNOLOGIES, LLC, Lincolnshire, IL (US)

(72) Inventors: Christopher W. Brock, Manorville, NY (US); Paul Anthony Belisch, Fort Worth, TX (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/284,896

(22) Filed: Oct. 4, 2016

(65) Prior Publication Data
US 2018/0096182 A1  Apr. 5, 2018

(51) Int. Cl.
*G06K 7/10* (2006.01)
*G06K 7/14* (2006.01)

(52) U.S. Cl.
CPC ....... *G06K 7/10732* (2013.01); *G06K 7/1413* (2013.01); *G06K 2207/1011* (2013.01)

(58) Field of Classification Search
CPC ............ G06K 7/10732; G06K 7/1413; G06K 2207/1011
See application file for complete search history.

(56) References Cited

U.S. PATENT DOCUMENTS

| 5,783,811 | A  | * | 7/1998  | Feng   | G01J 3/51 |
|           |    |   |         |        | 235/462.42 |
| 5,811,774 | A  | * | 9/1998  | Ju     | G01J 3/51 |
|           |    |   |         |        | 235/455 |
| 6,179,208 | B1 | * | 1/2001  | Feng   | G06K 7/10722 |
|           |    |   |         |        | 235/462.24 |
| 6,974,085 | B1 | * | 12/2005 | Koenck | G06K 7/10544 |
|           |    |   |         |        | 235/462.45 |
| 2005/0103846 | A1 | | 5/2005 | Zhu et al. | |
| 2007/0034696 | A1 | | 2/2007 | Barkan et al. | |
| 2007/0095916 | A1 | | 5/2007 | Joseph et al. | |

(Continued)

FOREIGN PATENT DOCUMENTS

WO    2010/098999 A1    9/2010

OTHER PUBLICATIONS

A V Arecchi et al., Field Guide to Illumination, SPIE Press, Bellingham, W A (2007). Available at: http://spie.org/publications/fg11_p68_lenslet_arrays?SSO=1.

(Continued)

*Primary Examiner* — Thien M Le
*Assistant Examiner* — Asifa Habib
(74) *Attorney, Agent, or Firm* — Yuri Astvatsaturov

(57) ABSTRACT

A hybrid aiming/illuminating light assembly in an imaging reader directs a visible aiming pattern and an illumination light pattern on a target to be read by image capture. In a preferred embodiment, the assembly includes a light source for emitting visible light rays, a collimating lens component for collimating the light rays, and a lenslet component having an array of lenslets configured to optically modify the collimated light rays to generate and project the visible aiming pattern on the target to locate the target, and to also project the illumination light pattern on the target to illuminate the target.

14 Claims, 5 Drawing Sheets

(56) References Cited

U.S. PATENT DOCUMENTS

| | | |
|---|---|---|
| 2009/0088203 A1 | 4/2009 | Havens et al. |
| 2009/0140048 A1* | 6/2009 | Yu ...................... G02B 27/0966 235/462.35 |
| 2010/0078483 A1* | 4/2010 | Liu .................... G06K 7/10732 235/462.42 |
| 2010/0155481 A1* | 6/2010 | Vinogradov ....... G06K 7/10722 235/462.21 |
| 2011/0280628 A1* | 11/2011 | Kim ...................... G02B 3/005 399/218 |
| 2013/0334314 A1 | 12/2013 | Vinogradov et al. |
| 2015/0371070 A1 | 12/2015 | Shi et al. |

OTHER PUBLICATIONS

A V Arecchi et al., Field Guide to Illumination, SPIE Press, Bellingham, W A (2007).
Office Action for GB Patent Application No. 1715536.7 dated Mar. 14, 2018.

* cited by examiner

MODULE AND SYSTEM FOR, AND METHOD OF, DIRECTING AN AIMING PATTERN ON, AND ILLUMINATING, A TARGET TO BE ELECTRO-OPTICALLY READ BY IMAGE CAPTURE

BACKGROUND OF THE INVENTION

The present disclosure relates generally to an imaging module and a system for, and a method of, directing an aiming pattern on, and illuminating, a target to be electro-optically read by image capture during operation of an imaging reader, and more particularly, to a hybrid aiming/illuminating assembly for aiming the reader at, and illuminating, the target during the operation of the reader.

Solid-state imaging systems or imaging readers have been used, in both handheld and/or hands-free modes of operation, to electro-optically read targets, such as one- and two-dimensional bar code symbol targets, and/or non-symbol targets, such as documents. A handheld imaging reader includes a housing having a handle held by an operator, and an imaging module, also known as a scan engine, supported by the housing and aimed by the operator at a target during reading. The imaging module includes a solid-state imager or imaging sensor with an array of photocells or light sensors, which correspond to image elements or pixels in an imaging field of view of the imager, and an imaging lens assembly for capturing return light scattered and/or reflected from the target being imaged, and for projecting the return light onto the array to initiate capture of an image of the target. Such an imager may include a one- or two-dimensional charge coupled device (CCD) or a complementary metal oxide semiconductor (CMOS) device and associated circuits for producing and processing electronic signals corresponding to a one- or two-dimensional array of pixel data over the imaging field of view.

In order to increase the amount of the return light captured by the array, especially in dimly lit environments and/or at far range reading, the imaging module generally also includes an illuminating light assembly for illuminating the target with illumination light over an illumination field or illumination light pattern for reflection and scattering therefrom. The illumination light pattern is typically generated by using an illuminating light source, e.g., one or more light emitting diodes (LEDs), and one or more sets of illuminating lenses.

In addition, to alleviate the problem that the operator cannot readily tell whether the reader is aimed directly at the target, which can be located anywhere within a range of working distances away from the reader, the imaging module generally also includes an aiming light assembly to provide visual feedback to the operator to advise where the reader is aimed. The known aiming light assembly utilizes at least one aiming light source, e.g., a laser, for generating an aiming beam, and an aiming element, including, for example, a diffractive optical element (DOE), or a refractive optical element (ROE), for focusing and optically modifying the aiming beam to direct a visible aiming light pattern, e.g., a spot, a line, or a cross-hairs, on the target prior to reading.

The use of a separate aiming light assembly and a separate illuminating light assembly increases the overall size, complexity and cost of manufacturing and assembling the imaging module and the reader. Also, the light sources of these separate assemblies have to each be electrically powered, and this extra power requirement undesirably drains an on-board battery typically provided in handheld, wireless imaging readers, thereby requiring more frequent recharging, more downtime, and shorter working lifetimes.

Accordingly, there is a need to reduce the size, complexity and cost of manufacturing and assembling the imaging module and the reader, and to make the imaging module and the reader more energy-efficient.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
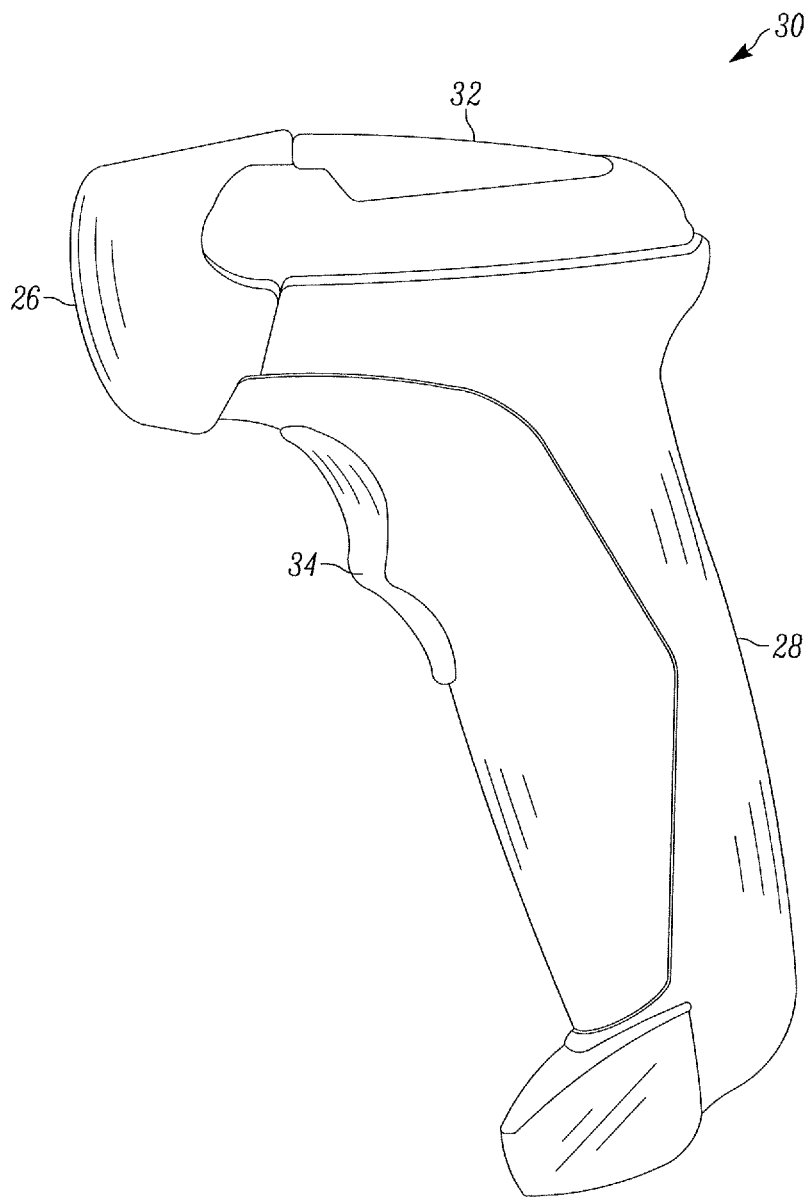
FIG. 1 is a side elevational view of a portable, handheld, imaging reader operative for directing an aiming pattern and an illumination light pattern on a target to be electro-optically read by image capture in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to an imaging module for reading a target, e.g., a bar code symbol, to be electro-optically read by image capture. The module includes a hybrid aiming/illuminating light assembly for generating and projecting a visible aiming pattern on the target to locate the target, and for simultaneously generating and projecting an illumination light pattern on the located target to illuminate the located target. The module also includes an imaging assembly for capturing return light over an imaging field of view from the illuminated, located target.

In a preferred embodiment, the hybrid aiming/illuminating light assembly includes a light source, e.g., a light emitting diode, for emitting visible light rays, a collimating lens component for collimating the light rays, and a lenslet component spaced along an optical axis away from the collimating lens component. The lenslet component has an array of lenslets generally arranged in a plane that is generally perpendicular to the optical axis. The array of lenslets is configured to optically modify the collimated light rays to generate and project the visible aiming pattern on the target, and to also project an illumination light pattern to illuminate the target. The imaging assembly includes a solid-state imager having an imaging array of image sensors and an imaging lens assembly for capturing the return light from the illuminated target, and for projecting the captured return light onto the imaging array.

Advantageously, the lenslets have individual input aspherical surfaces on which the collimated light rays are incident, and individual output aspherical surfaces for forming both the visible aiming pattern and the illumination light pattern. The lenslets are preferably arranged in mutually orthogonal rows and columns, and the lenslets at the ends of the rows and columns have different optical properties than the remaining lenslets to form the visible aiming pattern with a different light intensity, e.g., brighter or dimmer, than the illumination light pattern. The visible aiming pattern is preferably formed centrally of the illumination light pattern.

Another aspect of the present disclosure relates to a system for reading a target to be electro-optically read by image capture. The system includes a housing, preferably a handheld housing having a handle, and a light-transmissive window. The above-described imaging module is mounted in the housing, and the above-described hybrid aiming/illuminating light assembly projects the visible aiming pattern through the window on the target, and also projects the illumination light pattern through the window to illuminate the target.

Still another aspect of the present disclosure relates to a method of reading a target to be electro-optically read by image capture. The method is performed by generating and projecting a visible aiming pattern on the target to locate the target, by simultaneously generating and projecting an illumination light pattern on the located target to illuminate the located target, and by capturing return light over an imaging field of view from the illuminated, located target. In a preferred embodiment, the projecting of the visible aiming pattern and the illumination light pattern is performed by emitting visible light rays from a light source, collimating the light rays with a collimating lens component, spacing a lenslet component along an optical axis away from the collimating lens component, generally arranging an array of lenslets of a lenslet component in a plane that is generally perpendicular to the optical axis, and configuring the array of lenslets to optically modify the collimated light rays to generate and project the visible aiming pattern on the target, and to also project the illumination light pattern to illuminate the target.

In accordance with this disclosure, the hybrid aiming/illuminating light assembly avoids having to provide and operate a separate aiming light assembly and a separate illuminating light assembly. The overall size, complexity and cost of manufacturing and assembling the imaging module and the reader are much reduced. Also, only one light source needs to be electrically powered to produce the aiming pattern and the illumination light pattern, thereby increasing the working lifetime of an on-board battery typically provided in handheld, wireless imaging readers, thereby resulting is less frequent recharging and less downtime.

Reference numeral 30 in FIG. 1 generally identifies an ergonomic imaging reader configured as a gun-shaped housing having an upper barrel or body 32 and a lower handle 28 tilted rearwardly away from the body 32. A light-transmissive window 26 is located adjacent the front or nose of the body 32. The imaging reader 30 is held in an operator's hand and used in a handheld mode in which a trigger 34 is manually depressed to initiate imaging of targets, especially bar code symbols, to be read in a range of working distances relative to the window 26. Housings of other configurations, as well as readers operated in the hands-free mode, could also be employed. Thus, although FIG. 1 depicts a gun-shaped, handheld housing, this is merely exemplary, because it will be understood that many other reader configurations may be employed in the practice of this invention disclosed herein. For example, the reader may alternatively be configured as a vertical slot scanner having a generally upright window, or as a horizontal slot scanner or flat-bed scanner having a generally horizontal window, or as a bi-optical workstation having both a generally horizontal window and a generally upright window. The reader may be used in many diverse environments.

Figure 2:
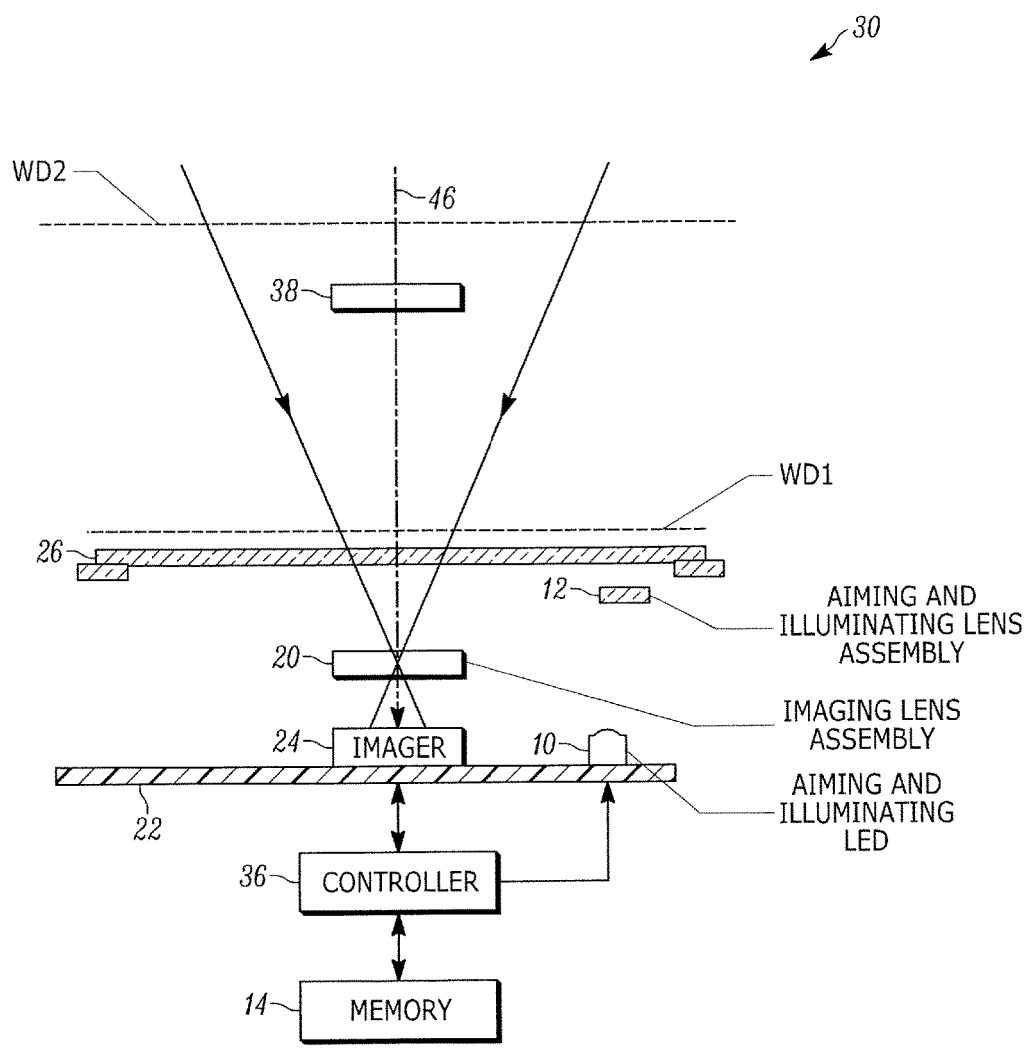
FIG. 2 is a schematic diagram of various components of an imaging module mounted in the reader of FIG. 1.

As schematically shown in FIG. 2, an imaging module includes an imaging sensor or imager 24 mounted on a printed circuit board (PCB) 22 in the reader 30. The PCB 22 is preferably mounted within the tilted handle 28. The imager 24 is a solid-state device, for example, a CCD or a CMOS imager having a one-dimensional array of addressable image sensors or pixels arranged in a single, linear row, or preferably a two-dimensional array of such sensors arranged in mutually orthogonal rows and columns, preferably with an anamorphic imaging field of view, and operative for detecting return light captured by an imaging lens assembly 20 along an imaging or optical axis 46 through the window 26. The return light is scattered and/or reflected from a bar code symbol or target 38 over the imaging field of view. The imaging field of view is generally perpendicular to the imaging axis 46.

The imaging lens assembly 20 is operative for focusing the return light onto the array of image sensors to enable the symbol 38 to be read. The symbol 38 may be located anywhere in a working range of distances between a close-in working distance (WD1) and a far-out working distance (WD2). In a preferred embodiment, WD1 is about one-half inch from the window 26, and WD2 is about thirty inches from the window 26. The imaging lens assembly 20 is located remotely from the window 26, for example, over forty millimeters away.

Figure 3:
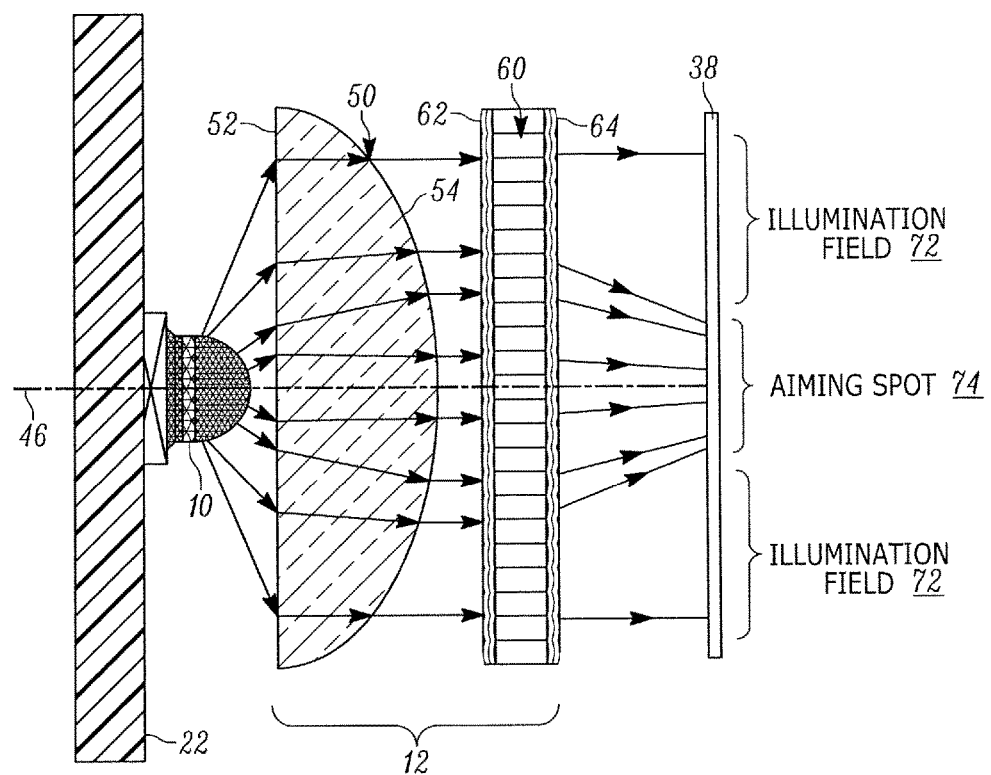
FIG. 3 is an enlarged side sectional view depicting components of a hybrid aiming/illuminating light assembly mounted on the imaging module of FIG. 2.
Figure 4:
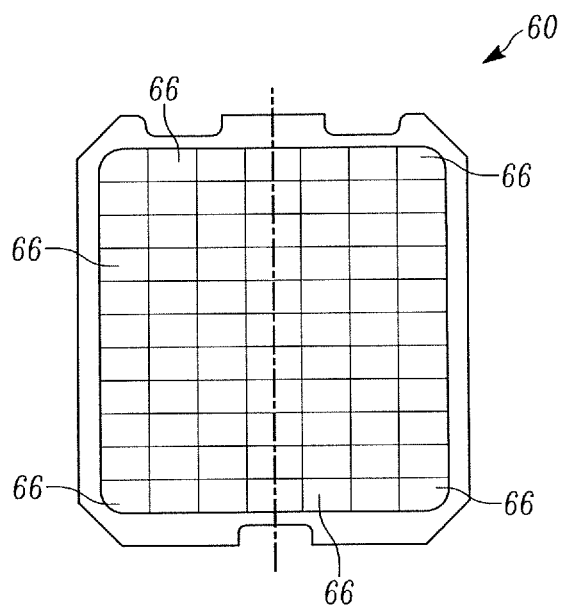
FIG. 4 is an elevational view of a lenslet array component of the hybrid aiming/illuminating light assembly of FIG. 3.
Figure 5:
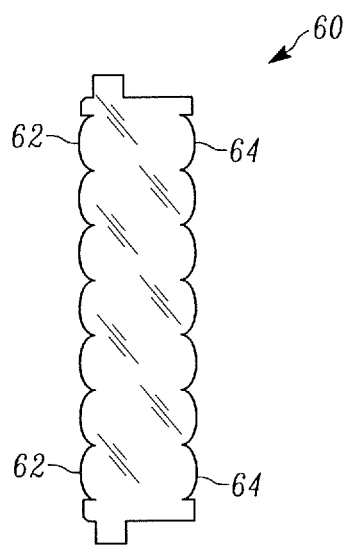
FIG. 5 is a sectional view of the lenslet array component of FIG. 4.
Figure 6:
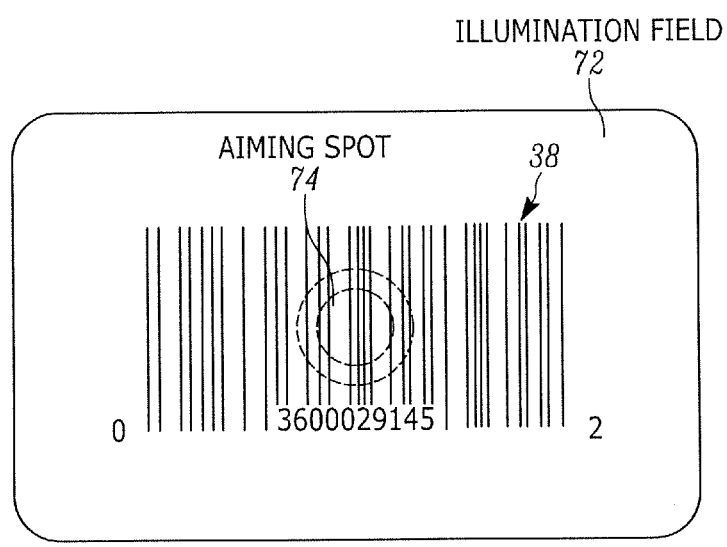
FIG. 6 is a plan view of an aiming pattern and an illumination light pattern on the target, as produced by the hybrid aiming/illuminating light assembly of FIG. 3.

In accordance with this disclosure, the imaging module also includes a hybrid aiming/illuminating light assembly for directing a visible aiming pattern or spot 74 (see FIGS. 3 and 6) on the target 38, and for illuminating the target 38 with illumination light over an illumination light pattern or field 72 (see FIGS. 3 and 6). The hybrid assembly includes, as shown in FIG. 2, an aiming and illuminating light source, preferably, a light emitting diode (LED) 10, for emitting visible light rays, and an aiming and illuminating lens assembly 12. Details of the hybrid assembly, as best seen in FIGS. 3-5, are described below.

As also shown in FIG. 2, the imager 24 and the LED 10 are operatively connected to a controller or microprocessor 36 operative for controlling the operation of these components. A memory 14 is connected and accessible to the controller 36. Preferably, the microprocessor is the same as the one used for processing the return light captured from the target 38 and for decoding the captured target image.

In operation, the controller 36 sends a command signal to energize the LED 10 for a short exposure time period, say 500 microseconds or less, and energizes and exposes the imager 24 to collect the return light, e.g., the illumination light and/or ambient light, from the target 38 only during said exposure time period. A typical array needs about 18-33 milliseconds to acquire the entire target image and operates at a frame rate of about 30-60 frames per second.

Turning now to FIG. 3, the LED 10 is surface-mounted on the PCB 22, and the aiming and illuminating lens assembly 12 is supported on the PCB 22 in a fixed position in front of the LED 10. The assembly 12 includes a collimating lens component 50 for collimating the light rays emitted by the LED 10, and a lenslet component 60 spaced along the optical axis 46 away from the collimating lens component 50. The collimating lens component 50 and the lenslet component 60 are generally centered on the optical axis 46. The collimating lens component 50 and the lenslet component 60 are either constituted of glass, or preferably, are each molded of a light-transmissive plastic material.

The collimating lens component 50 constitutes a positive lens having a planar surface 52 on which the emitted light rays are incident, and a convex surface 54 from which the collimated light rays exit the collimating lens component 50. The lenslets of the lenslet component 60 have individual input aspherical surfaces 62 on which the collimated light rays are incident, and individual output aspherical surfaces 64 for forming both the visible aiming pattern 74 and the illumination light pattern 72. The size for each lenslet is typically within 1×1 mm and the center thickness for each lenslet 64 is around 1.5 mm. The surfaces 62, 64 are optical quality grade surfaces with a high aspheric coefficient. The surfaces 62, 64 could be symmetric or non-symmetric about its center optical axis. The optical property of both surfaces 62, 64 and the center thickness determine the optical modification from that lenslet.

As best shown in FIG. 4, the lenslets are arranged in mutually orthogonal rows and columns. The lenslets 66 (see FIG. 4) at the ends of the rows and columns have different optical properties than the remaining lenslets to form the visible aiming pattern 74 with a different light intensity, e.g., brighter or dimmer, than the illumination light pattern 72. Preferably, as shown in FIGS. 3 and 6, the visible aiming pattern 74, shown as a generally circular spot, is formed centrally of the illumination light pattern 72, which is shown as a generally rectangular field. Thus, as shown in FIGS. 3 and 6, the illumination light pattern 72 is illuminated with a predetermined intensity that is different from the intensity of the aiming pattern 74, thereby enabling an operator to readily position the target 38 within the illumination light pattern 72. In a preferred embodiment, the intensity distribution of the spot 74 is greatest at its central area and falls off radially away from the central area of the spot 74. The transition of the intensity between the spot 74 and the illumination light pattern 72 is smooth and gradual, as depicted by the dashed concentric circles of FIG. 6.

In the foregoing specification, specific embodiments have been described. However, one of ordinary skill in the art appreciates that various modifications and changes can be made without departing from the scope of the invention as set forth in the claims below. For example, rather than the lenslet component 60, the hybrid aiming/illuminating light assembly 12 can be configured with other optical elements, such as a Fresnel lens, or other lenses that are configured to produce an aiming spot of greater or lesser intensity centrally in an illumination field. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging module for reading a target to be electro-optically read by image capture, comprising:
 a hybrid aiming/illuminating light assembly for generating and projecting a visible aiming pattern on the target to locate the target, and for simultaneously generating and projecting an illumination light pattern on the located target to illuminate the located target; and
 an imaging assembly for capturing return light over an imaging field of view from the illuminated, located target,
 wherein the hybrid aiming/illuminating light assembly includes a light source for emitting visible light rays, a collimating lens component for collimating the light rays, and a lenslet component spaced along an optical axis away from the collimating lens component, the lenslet component having an array of lenslets generally arranged in a plane that is generally perpendicular to the optical axis, the array of lenslets being configured to optically modify the collimated light rays to generate and project the visible aiming pattern on the target, and to also generate and project the illumination light pattern on the target, and
 wherein the lenslets are arranged in mutually orthogonal rows and columns, and wherein the lenslets at the ends of the rows and columns have different optical properties than the remaining lenslets to form the visible aiming pattern with a different light intensity than the illumination light pattern.

2. The module of claim 1, wherein the imaging assembly includes a solid-state imager having an imaging array of image sensors and an imaging lens assembly for capturing and projecting the return light onto the imaging array.

3. The module of claim 1, and a printed circuit board on which the hybrid aiming/illuminating light assembly and the imaging assembly are mounted.

4. The module of claim 1, wherein the collimating lens component constitutes a positive lens having a planar surface on which the emitted light rays are incident, and a convex surface from which the collimated light rays exit the collimating lens component.

5. The module of claim 1, wherein the lenslets have individual input aspherical surfaces on which the collimated light rays are incident, and individual output aspherical surfaces for forming both the visible aiming pattern and the illumination light pattern.

6. The module of claim 1, wherein the visible aiming pattern is formed centrally of the illumination light pattern.

7. A system for reading a target to be electro-optically read by image capture, comprising:
 a housing having a light-transmissive window; and
 an imaging module mounted in the housing, the module including a hybrid aiming/illuminating light assembly for generating and projecting a visible aiming pattern through the window on the target to locate the target, and for simultaneously generating and projecting an illumination light pattern through the window on the located target to illuminate the located target, and an imaging assembly for capturing return light through the window over an imaging field of view from the illuminated, located target,
 wherein the hybrid aiming/illuminating light assembly includes a light source for emitting visible light rays, a collimating lens component for collimating the light rays, and a lenslet component spaced along an optical axis away from the collimating lens component, the lenslet component having an array of lenslets generally arranged in a plane that is generally perpendicular to the optical axis, the array of lenslets being configured to optically modify the collimated light rays to generate and project the visible aiming pattern on the target, and to also generate and project the illumination light pattern on the target, and
 wherein the lenslets are arranged in mutually orthogonal rows and columns, and wherein the lenslets at the ends of the rows and columns have different optical properties than the remaining lenslets to form the visible aiming pattern with a different light intensity than the illumination light pattern.

8. The system of claim 7, wherein the imaging assembly includes a solid-state imager having an imaging array of image sensors and an imaging lens assembly for capturing and projecting the return light onto the imaging array.

9. The system of claim 7, wherein the collimating lens component constitutes a positive lens having a planar surface on which the emitted light rays are incident, and a convex surface from which the collimated light rays exit the collimating lens component.

10. The system of claim 7, wherein the lenslets have individual input aspherical surfaces on which the collimated light rays are incident, and individual output aspherical surfaces for forming both the visible aiming pattern and the illumination light pattern.

11. The system of claim 7, wherein the visible aiming pattern is formed centrally of the illumination light pattern.

12. A method of reading a target to be electro-optically read by image capture, comprising:
 generating and projecting a visible aiming pattern on the target to locate the target;
 simultaneously generating and projecting an illumination light pattern on the located target to illuminate the located target;
 capturing return light over an imaging field of view from the illuminated, located target, wherein the projecting of the visible aiming pattern and the illumination light pattern is performed by emitting visible light rays from a light source, collimating the light rays with a collimating lens component, spacing a lenslet component along an optical axis away from the collimating lens component, generally arranging an array of lenslets of a lenslet component in a plane that is generally perpendicular to the optical axis, and configuring the array of lenslets to optically modify the collimated light rays to generate and project the visible aiming pattern on the target, and to also project the illumination light pattern to illuminate the target; and arranging the lenslets in mutually orthogonal rows and columns, and configuring the lenslets at the ends of the rows and columns with different optical properties than the remaining lenslets to form the visible aiming pattern with a different light intensity than the illumination light pattern.

13. The method of claim 12, and configuring the collimating lens component as a positive lens having a planar surface on which the emitted light rays are incident, and a convex surface from which the collimated light rays exit the collimating lens component.

14. The method of claim 12, and configuring the lenslets with individual input aspherical surfaces on which the collimated light rays are incident, and with individual output aspherical surfaces for forming both the visible aiming pattern and the illumination light pattern.

* * * * *